July 18, 1967  R. J. KASPER  3,331,909
APPARATUS FOR ENERGIZING AN INDUCTION MELTING FURNACE
WITH A THREE PHASE ELECTRICAL NETWORK
Filed March 12, 1965

INVENTOR.
ROBERT J. KASPER
BY
*Tilberry & Body*
ATTORNEYS

United States Patent Office 3,331,909
Patented July 18, 1967

3,331,909
APPARATUS FOR ENERGIZING AN INDUCTION MELTING FURNACE WITH A THREE PHASE ELECTRICAL NETWORK
Robert J. Kasper, Seven Hills, Ohio, assignor to The Ohio Crankshaft Company, Cleveland, Ohio, a corporation of Ohio
Filed Mar. 12, 1965, Ser. No. 439,182
9 Claims. (Cl. 13—27)

This invention pertains to the art of induction melting furnaces and more particularly to an apparatus for energizing an induction melting furnace with a three phase electrical network.

The invention is particularly applicable for energizing a coreless induction melting furnace and it will be described with particular reference thereto; however, it will be appreciated that the invention has much broader applications and may be used for energizing other induction heating equipment.

An induction melting furnace generally includes a water cooled induction heating coil connected in one phase of a three phase electrical network. With the other two phases of the network being unloaded, an unsymmetric condition is imposed on the three phase network which causes high electrical losses within the network and high voltage drops along the conductors of the network. Unsymmetric loading of the network also substantially reduces the overall efficiency of the melting furnace installation. Moreover, this unbalance in the three phase network distorts the voltage triangle of the network and impairs the operation of other electrical components, such as motors and transformers, connected across the same network. These disadvantages caused by the induction melting furnace being connected across one phase of a three phase network are only representative of the numerous electrical difficulties encountered by the insertion of this single phase load in a three phase electrical system. Consequently, power companies often limit the amount of power which can be consumed in single phase loads, such as induction melting furnaces. In addition, power companies quite often charge a premium for use of a single phase load in one phase of a three phase power network because of the lower efficiencies and other difficulties encountered when such a load is used.

To overcome the difficulties experienced when inserting a single phase load, such as a melting furnace, across a three phase network, it has been proposed to electrically balance the single phase load by inserting separate, wattless loads in the other two phases of the network. Although this arrangement did substantially balance the single phase load, such an arrangement resulted in many additional electrical components that appreciably increased the capital expense of the melting furnace installation.

These and other disadvantages of prior arrangements for balancing a three phase network used to energize a single phase load, such as an induction melting furnace, are completely overcome by the present invention which is directed toward an apparatus for energizing an induction melting furnace with a three phase network which apparatus requires fewer appended electrical components than similar apparatus for this general purpose.

The present invention is directed toward an improvement in the combination of a coreless induction melting furnace, having a single phase heating coil and a metal receiving chamber coterminous with the coil, and a three phase network for energizing the coil. In accordance with the invention, the improvement comprises dividing the heating coil into an active melting section and an inactive, non-melting section and providing a tuning capacitor across the active, melting section while the inactive, non-melting section is untuned to exhibit an inductive, substantially wattless load with the tuned active melting section of the coil being connected in a first phase of the three phase network, and the untuned inactive, non-melting section being connected in a second phase of the three phase network.

By the arrangement defined above, the untuned section of the heating coil, which is within the furnace itself, is utilized as a wattless inductive load to balance the tuned, melting section of the coil. By applying a capacitive wattless load in the third phase of the three phase network, the three phase network is balanced to overcome the difficulties outlined above. It is appreciated that, by using a section of the heating coil itself as the inductive wattless load in one phase of the three phase network, the need for a separate wattless inductor is eliminated. This elimination of the wattless inductor decreases the overall capital expense of the melting furnace installation.

The primary object of the present invention is the provision of an apparatus for energizing a single phase induction melting furnace with a three phase network which apparatus balances the network, is less expensive than prior such apparatus and is efficient in operation.

Another object of the present invention is the provision of an apparatus for energizing a single phase induction melting furnace with a three phase network which apparatus uses a section of the induction heating coil in the furnace itself as a substantially wattless, inductive load to balance the three phase network.

Another object of the present invention is the provision of an apparatus for energizing a single phase induction melting furnace with a three phase network which apparatus uses a heretofore generally unused section of the induction heating coil as a substantially wattless, inductive load to balance the three phase network. Thus, the complete coil of the furnace is used.

These and other objects and advantages will become apparent from the following description used to illustrate the preferred embodiment of the invention as read in connection with the accompanying drawing in which.

Figure 1:
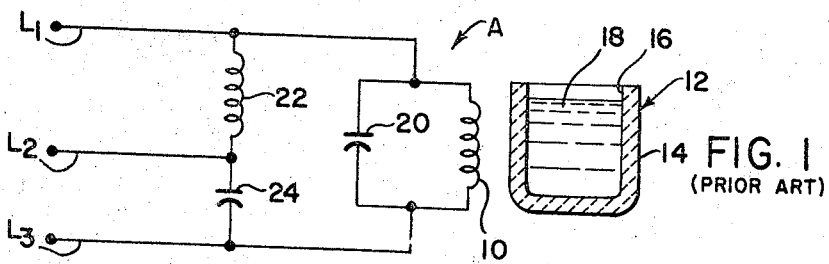
FIGURE 1 is a wiring diagram illustrating, somewhat schematically, the prior art to which the present invention is directed.

Referring now to the drawing wherein the showings are for the purpose of illustrating preferred embodiments of the invention only and not for the purpose of limiting same, FIGURE 1 shows the prior art to which the present invention is directed. This prior art included an apparatus A for energizing the induction heating coil 10 of a melting furnace 12. The melting furnace 12 includes a refractory, insulated wall 14 surrounding a metal receiving chamber 16 used to hold molten metal 18. The coil 10 is generally water cooled and is embedded within the wall 14, so that the coil can be spaced only slightly from the metal 18 within the chamber 16. The induction heating coil 10 is electrically connected across one phase, $L_{1-2}$, of a three phase network comprising power lines $L_1$, $L_2$ and $L_3$. A capacitor 20 is connected in parallel with the heating coil 10 and has a capacitance selected to tune the coil at the frequency of three phase network. Consequently, a substantially unity power factor appears in phase $L_{1-2}$. As so far described, the single phase heating coil 10 would unbalance the three phase network and seriously affect the electrical characteristics of the network; therefore, in accordance with the illustrated prior art, a wattless inductive load, taking the form of an inductor 22, is connected across phase $L_{1-3}$ and a wattless capacitive load, taking the form of a capacitor 24, is connected across phase $L_{2-3}$. By selecting the proper inductance and capacitance values for the inductor 22 and the capacitor 24, the three phase network is approximately balanced.

The apparatus A, as illustrated in FIGURE 1, required an auxiliary wattless inductor 22 which substantially added to the overall cost of the apparatus. The present invention is directed toward an improvement in apparatus A which overcomes this disadvantage and eliminates the necessity for an auxiliary inductor to balance the three phase network.

Figure 2:
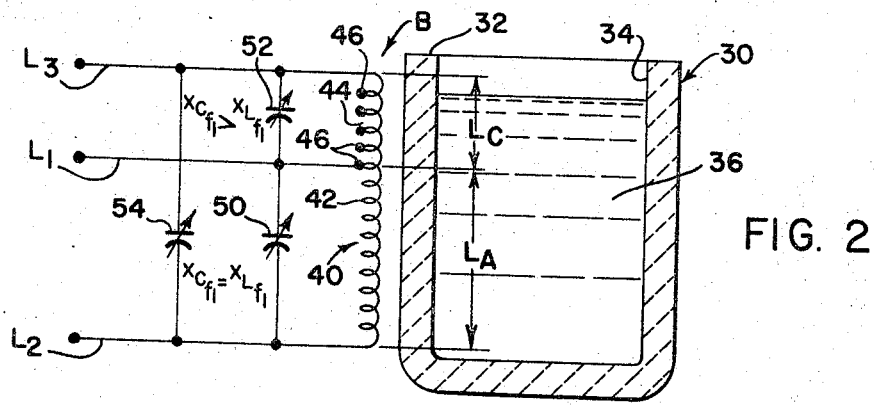
FIGURE 2 is a wiring diagram illustrating, somewhat schematically, the preferred embodiment of the present invention.

In accordance with the preferred embodiment of the invention, as shown in FIGURE 2, apparatus B is utilized for energizing melting furnace 30 by a three phase network including power lines $L_1$, $L_2$ and $L_3$. The furnace includes a refractory, insulation wall 32 surrounding an internal metal receiving chamber 34 adapted to be filled with a molten metal 36. Surrounding the metal 36 there is provided an induction heating coil 40, which is schematically shown outside the wall of the furnace 30; however, it should be realized that the coil is generally water cooled and mounted within the wall 32.

During the heating operation and while the metal is being held in a molten condition, the heating coil 40 is, in effect, divided into two separate, axially spaced sections. The lower section 42, which can be referred to as the active, heating or melting section $L_A$ of the coil, is used to raise the temperature of the metal 36 within the furnace. The upper section 44, which can be referred to as the inactive, cooling or non-melting section $L_C$ of the coil, is used for cooling the refractory wall 32 above the melting area of the furnace. The cooling effect of the inactive section 44 results from water or other coolant being circulated through the coil 40 as was previously explained. In accordance with the present invention, only the lower section 42 is connected in phase $L_{1-2}$ of the three phase network and the upper inactive section 44 is connected in phase $L_{1-3}$ of the network. Taps 46 are axially spaced along the upper section 44 so that a selected amount of the upper section can be inserted within phase $L_{1-3}$ of the three phase network.

In accordance with the invention, the apparatus B includes a capacitor 50 which is adjustable to tune only the lower section 42, instead of the whole heating coil as was done in the prior art. An adjustable capacitor 52 is connected in parallel across upper section 44 of coil 40. The capacitive reactance of capacitor 52 is always substantially below the inductive reactance of the coil section 44 so that the capacitor functions only to adjust the effective amount of the inductive reactance across coil section 44. In other words, the lower section 42 of the coil is tuned, in accordance with known procedures, and the upper section 44 forms a substantially wattless inductive load, which load can be adjusted by varying the cancelling capacitive reactance of capacitor 52. In this manner, the upper section 44, which was heretofore an unused portion of the heating coil 40, takes the place of the wattless inductive load, formed by inductor 22 in FIGURE 1.

Balancing of the three phase network is completed by a capacitor 54 connected in phase $L_{1-2}$. This capacitor is adjustable to provide the necessary capacitive, wattless load for balancing the third phase of the network, in a manner similar to the capacitor 24, shown in FIGURE 1.

Summarizing the operation of apparatus B, as shown in FIGURE 2, the heating coil 40 is divided into two separate sections 42, 44 which substantially correspond to the normal active and inactive sections of the heating coil in a melting furnace. The lower active section 42 of the coil is tuned by a capacitor; whereas, the upper section 44 is utilized as a wattless inductive load to assist in balancing the three phase network. To adjust the effective amount of the wattless inductive load, there are two distinct structures illustrated. First, the wattless inductive load can be adjusted by selecting the proper tap 46 for changing the effective length of section 44. Secondly, the capacitor 52 may be adjusted to offset a desired portion of the inductive reactance created in the network by the coil section 44. These two structures can be used separately or they may be used in combination to adjust the effective wattless inductive load across phase $L_{1-3}$. The adjustable capacitor 54 across phase $L_{1-2}$ completes the balancing of the network. This arrangement provides a substantially simplified apparatus for balancing the single phase heating coil of an induction melting furnace connected in one phase of a three phase network.

Figure 3:
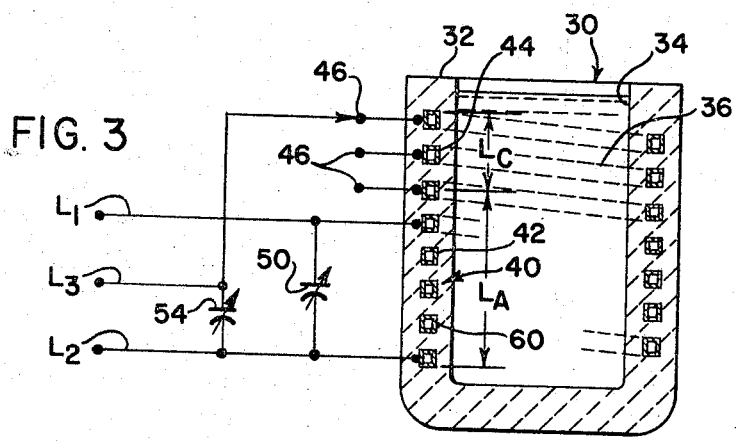
FIGURE 3 is a wiring diagram illustrating, somewhat schematically, a modification of the preferred embodiment shown in FIGURE 2.

Referring now to FIGURE 3, a modification of the preferred embodiment of the invention is illustrated. In this embodiment, the capacitor 52 is removed and the axially spaced taps 46 form the primary arrangement for adjusting the inductive reactance within phase $L_{1-3}$ by changing the effective length of section 44. Coolant passage 60 within the coil 40 is illustrated. This coolant passage is generally standard in an induction melting furnace and it is used to maintain the coil and the surrounding insulation wall 32 at a temperature below the temperature of the molten metal within the chamber 34. Although the coolant passage is illustrated in FIGURE 3, it is appreciated that the coils in the other figures also include this structure. This embodiment of the invention functions in a manner similar to the embodiment shown in FIGURE 2.

Figure 4:
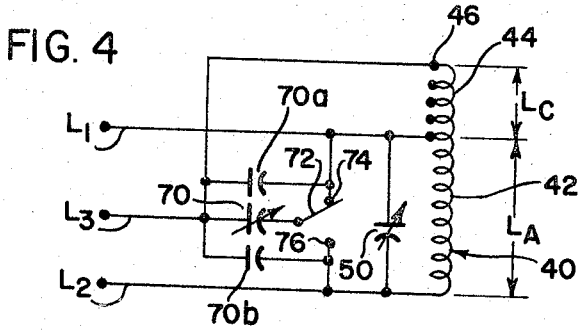
FIGURE 4 is a wiring diagram illustrating, somewhat schematically, a further modification of the preferred embodiment shown in FIGURE 2.

A further modification of the invention is shown in FIGURE 4. In this modification, a single adjustable capacitor 70 is utilized for balancing the three phase network including the single phase coil section 42 in one phase thereof. Fixed reactance capacitors 70a, 70b are connected across phases $L_{1-3}$ and $L_{2-3}$, respectively to provide an offset for the inductance of coil section 44 and the primary balance in phase $L_{2-3}$. A multiple position switch, schematically represented as a movable bar 72 and spaced contacts 74, 76, is utilized for switching the capacitor 70 between phase $L_{1-3}$ and phase $L_{2-3}$. The capacitor 70 when in phase $L_{1-3}$ functions to assist fixed capacitor 70a in offsetting the inductive reactance of section 44 or when in phase $L_{2-3}$ it functions to assist fixed capacitor 70b in balancing the phase. It has been found that in some installations, the use of a single adjustable capacitor bank, selectively inserted in the non-loaded phases can be used to balance the three phase network in a manner illustrated in FIGURE 4.

In accordance with the broadest aspect of the invention, the coil 40 is divided into two separate sections with one of the sections being tuned and the other of the sections being untuned to form a substantially wattless inductive load. This wattless inductive load, or untuned section, is utilized within a separate phase of the three phase network to assist in balancing the network; whereas, the tuned section of the coil is utilized for the actual heating operation. It is appreciated that the tuned and untuned portions of the coil could be located at various positions along the heating coil within the melting furnace; however, because the upper coils are generally not used electrically in the melting furnace, it is preferred that the upper section of the coil be used as the substantially wattless inductive load. It should be appreciated that in some installations, a lower section of the furnace coil may be used as the untuned, substantially wattless load because the electrical impedance across such a lower section remains substantially constant during operation of the furnace. However, with this arrangement, the untuned coil section will draw more watts than the untuned coil section illustrated in the figures.

The present invention has been described in connection with certain structural embodiments; however, it is appreciated that various structural changes may be made in these embodiments without departing from the intended spirit and scope of the present invention as defined in the appended claims.

Having thus described my invention, I claim:

1. In the combination of a coreless induction melting furnace having a heating coil and a metal receiving chamber coterminous with said coil, and a three phase network for energizing said coil, the improvement comprising: said heating coil being divided into an active melting section and an inactive, non-melting section, a tuning capacitor being connected across said active, melting section, said inactive non-melting section being untuned to exhibit an inductive, substantially wattless load, said tuned active melting section of said coil being connected in a first phase of said three phase network, and said untuned inactive, non-melting section being connected in a second phase of said three phase network.

2. The improvement as defined in claim 1 including a capacitive, substantially wattless load connected in the third phase of said three phase load.

3. The improvement as defined in claim 1 including a capacitor in parallel with said inactive, non-melting section of said coil, said capacitor having a capacitive reactance substantially less than the inductive reactance of said inactive section at the operating frequency of said coil.

4. In the combination of a coreless induction melting furnace having a heating coil and a metal receiving chamber coterminous with said coil, and a three phase network for energizing said coil, said coil being divided into a lower metal melting section and an upper inactive, cooling section with said lower section being substantially greater in axial length than said upper section, the improvement comprising: said three phase network including a first phase connected across only said lower metal melting section of said heating coil, a first capacitor connected across said first phase and in parallel with said lower metal melting section of said heating coil to tune the inductance of said lower section of said coil, a second phase connected across at least a part of said upper inactive, cooling section of said heating coil to provide an inductive, substantially wattless load in said second phase and a capacitive wattless load connected across said third phase.

5. The improvement as defined in claim 4 wherein said upper cooling section of said heating coil is provided with a plurality of axially spaced taps and means for connecting said second phase to a selected one of said taps to change the part of said upper section within said second phase to correspondingly change the wattless load in said second phase.

6. The improvement as defined in claim 4 including a second capacitor connected across said second phase in parallel with said upper inactive, cooling section of said heating coil to decrease the total effective inductive, substantially wattless load across said second phase.

7. The improvement as defined in claim 6 wherein said second capacitor has an adjustable capacitance to adjust the total effective inductive, substantially wattless load across said second phase.

8. The improvement as defined in claim 4 wherein said capacitive wattless load in said third phase is created by a second capacitor, said second capacitor being connected in said third phase and having an adjustable capacitance.

9. In the combination of a coreless induction melting furnace having a heating coil and a metal receiving chamber coterminous with said coil, and a three phase network for energizing said coil, said coil being divided into a lower metal melting section and an upper inactive, cooling section with said lower section being substantially greater in axial length than said upper section, the improvement comprising: said three phase network including a first phase connected across only said lower metal melting section of said heating coil, a first capacitor connected across said first phase and in parallel with said lower metal melting section of said coil to tune the inductance of said coil, a second phase connected across at least a part of said upper inactive, cooling section of said heating coil to provide an inductive, substantially wattless load in said second phase, a capacitive wattless load, and switch means for selectively changing said capacitive load between a first position in parallel with said inductive load and a second position across said third phase.

References Cited

UNITED STATES PATENTS

| | | | |
|---|---|---|---|
| 1,926,811 | 9/1933 | Long | 219—10.75 |
| 2,741,690 | 4/1956 | Junker | 219—10.75 |
| 3,040,231 | 6/1962 | Biringer | 323—76 |
| 3,053,920 | 9/1962 | Seitz | 13—26 |
| 3,265,958 | 8/1966 | Senlen | 323—76 |

RICHARD M. WOOD, *Primary Examiner.*

L. H. BENDER, *Assistant Examiner.*